United States Patent [19]

Sakurai et al.

[11] Patent Number: 4,755,228
[45] Date of Patent: Jul. 5, 1988

[54] MOLDING MATERIAL

[75] Inventors: Seiji Sakurai; Kaoru Umino, both of Kanagawa, Japan

[73] Assignee: Nichias Corporation, Tokyo, Japan

[21] Appl. No.: 48,842

[22] Filed: May 12, 1987

[30] Foreign Application Priority Data

May 12, 1986 [JP] Japan ................................ 61-106696

[51] Int. Cl.$^4$ ............................................... C04B 7/32
[52] U.S. Cl. ..................... 106/104; 106/38.3; 106/85
[58] Field of Search .............. 106/104, 85, 38.3

[56] References Cited

U.S. PATENT DOCUMENTS 4,060,425 11/1977 Harada et al. ........................ 106/104
4,100,115 7/1978 Baer ..................................... 106/75 X
4,150,189 4/1979 Pusch ................................... 106/104

FOREIGN PATENT DOCUMENTS 0255400 6/1976 Fed. Rep. of Germany ...... 106/104
0167163 12/1980 Japan .................................. 106/85
0071569 4/1985 Japan .................................. 106/104
0226438 11/1985 Japan .................................. 106/104

Primary Examiner—William R. Dixon, Jr.
Assistant Examiner—James M. Hunter, Jr.
Attorney, Agent, or Firm—Sughrue, Mion, Zinn, Macpeak & Seas

[57] ABSTRACT

A molding material of a mixture of 0.1-7 wt % of alkali-resistant zirconia glass fibers of 3-25 mm length, 20-60 wt % of wollastonite fibers, and 40-80 wt % of calcium aluminate cement.

4 Claims, No Drawings

MOLDING MATERIAL

BACKGROUND OF THE INVENTION

1. Field of the Invention

The present invention relates to a water-hardenable molding material that has a high heat resistance, good heat insulation, high resistance to molten metals, good electrical insulation and good machinability and which provides moldings that are advantageously used as heat insulators or electrical insulators. The molding material of the present invention is particularly useful in the manufacture of lining materials and melt receptacles for use with low-melting point metal casting apparatus.

2. Background of the Invention

Castable refractories are extensively used as lining materials in manufacturing, constructing or repairing runners, melt holding furnaces, ladles and other members that come in contact with the melt in an apparatus for casting aluminum or other metals having comparatively low melting points. After being mixed with an appropriate amount of water, castable refractories are poured into a form work, hardened, dried and fired to produce linings that have no adhesive water or water of crystallization. The so prepared linings are highly refractory and will not generate any steam during service.

Castable refractories that have heretofore been used as the material of linings on low-melting point metal casting apparatus are mostly based on alumina cements that are not easily wettable with molten aluminum or other metals and which have fairly good resistance to corrosion. However, the lining materials made of conventional aluminous-cement based castable refractories are not completely satisfactory in terms of flexural strength. In addition, if the hydrate of aluminous cement (i.e., calcium aluminate cement) undergoes rapid reactions of decomposition and dehydration either during firing that is effected before reception of molten metal or as a result of temperature increases following contact with a molten metal that occurs during service, the lining will readily experience a reduction in strength and cracking due to excessive shrinkage may easily occur. In order to avoid these problems, the firing of the lining materials prior to reception of molten metal has to be accomplished by slowly elevating the temperature over a period that usually lasts for one to two weeks. A further problem of the prior art lining material is that it is difficult to form products of complex shapes.

SUMMARY OF THE INVENTION

An object, therefore, of the present invention is to provide a castable refractory that will not readily produce cracking during firing or service at elevated temperatures which displays good properties such as high strength and good heat insulation.

Another object of the present invention is to provide a multi-purpose water-hardenable molding material that can be used not only as a castable refractory but also in the production of various moldings that require such properties as high heat resistance, good heat insulation, high resistance to molten metals, good electrical resistance and good machinability.

These objects of the present invention can be attained by a molding material which is made of mixture of 0.1-7 wt% of glass fibers, 20-60 wt% wollastonite fibers and 40-80 wt% of calcium aluminate cement.

DETAILED DESCRIPTION OF THE PREFERRED EMBODIMENTS

As in the case of the prior art aluminous-cement based refractories, the calcium aluminate cement incorporated in the molding material of the present invention serves as a binder that is highly resistant to corrosion and which is not readily wettable with the melts of the aluminum or other low-melting point metals. No special type of calcium aluminate cement needs to be used and an appropriate composition may be selected depending upon the use from among ordinarilly commercial products with about 40-80 wt% of $Al_2O_3$ and about 15-40 wt% of CaO. Wollastonite fibers are well known and are formed of metacalcium silicate ($CaSiO_3$; m.p. 1,540° C.) in a fibrous form that has a diameter of form about 3 to 50 $\mu$m, a length of no more than about 1 mm, and an aspect ratio (length-to-diameter ratio) of about 3-20.

Wallastonite fibers incorporated in an amount of 20-60 wt% are effective not only in preventing the occurrence of cracking during firing but also in improving the heat resistance, heat insulation and strength of the finally obtained molding. The desired effects of wallastonite fibers will not be exhibited if their content is less than 20 wt%. Incorporating more than 60 wt% of wollastonite fibers is detrimental not only to the strength but also to the corrosion resistance of the molding.

Glass fibers are used to prevent the occurrence of cracking during firing and to reinforce the resulting molding. Alkali-resistant glass fibers with a diameter of about 1-30 $\mu$m and a length of about 3-25 mm are preferable and those containing a zirconia component are particularly preferable. The glass fibers must be incorporated in an amount of at least 0.1 wt% but if they are used in excessive amounts, not only does it become difficult to achieve a uniform dispersion of the fibers but also the heat and corrosion resistance of the molding is impaired, with the attendant possibility of retardant setting of the alumina cement. Therefore, the glass fibers should not be incorporated in amounts exceeding 7 wt%.

The reinforcing effect of either glass fibers or wollastonite fibers incorporated in common cement products molded calcium silicate is known. However, cracking occurs in alumina-cement bound moldings or semi-finished products thereof as a result of decomposition and dehydration of the aluminous cement hydrate when they are heated to high temperature. It has not been known that this cracking can be prevented by using glass fibers in combination with wollastonite fibers. Glass fibers are an effective suppressor of crack propagation but because of the reason stated in the preceding paragraph, they cannot be incorporated in sufficient amounts to enable the prevention of cracking by their use alone. Wollastonite fibers alone are unable to inhibit the occurrence of cracking during heating at elevated temperatures because they are too short to suppress the propagation of cracking one it has developed. In accordance with the present invention, wollastonite fibers that have good affinity for hardened calcium aluminate cement and which can be incorporated in large quantities are used to achieve maximum prevention of the occurrence of tiny cracks while the propagation of any tiny cracks that have developed is restrained by glass fibers. Only by this combination of wallastonite and glass fibers does it become possible to prevent the occurrence of cracking in molded products based on cement.

The wollastonite fibers incorporated in the large amounts in the molding material of the present invention also serve to provide molding that are easily machinable, for instance, by cutting.

The molding materials of the present invention can be processed in the same manner as conventional castable refractories and other water-hardenable molding materials. It is first mixed with an appropriate amount of water. The mix is poured into a form work of a predetermined shape and molded by a suitable method such as vibrational fluidization. The molding is dried and fired at a temperature of about 700° C. or above in order to dehydrate the aluminous cement hydrate and to provide a heat-resistant product having consistent dimensions and composition. Firing can be performed very rapidly so that the intended temperature elevation is completed in a few hours and yet no cracking will occur in the final product. Therefore, in accordance with the present invention, highly heat-resistant moldings can be attained in a much shorter period and with a much smaller consumption of thermal energy as compared with the case where prior art castable refractories are used. In addition, complexly shaped moldings can be produced from the molding material of the present invention without taking the risk of crack development.

The molding material of the present invention has the advantage that it provides molded products that are not wettable with molten metals, have high heat resistance and good heat insulation, can be machined and which exhibit good electrical insulation (volume resistivity$\simeq 10^{13}$ ohms-cm; surface resistivity$\simeq 10^{13}$ ohms). Because of this advantage, the molding material of the present invention can be used not only in the production of the castable refractories but also molding materials for the manufacture of components of common metal casting apparatus, furnace materials, electrical insulators and many other products.

The following examples and comparative examples are provided for the purpose of further illustrating present invention.

EXAMPLES 1 TO 5 AND COMPARATIVE EXAMPLES 1 TO 4

Molding materials having the formulations indicated in Table 1 were thoroughly mixed with water and the resulting mixes were poured into forms. After curing for 24 hours, the moldings were removed from the forms, dried at 100° C. for 24 hours, heated to 700° C. at a rate of 100° C./hour, and fired at 700° C. for 3 hours in order to decompose and dehydrate the aluminous cement hydrate. By these procedures, three work products were produced from each of the molding materials: a hollow pipe (wall thickness, 20 mm; outside diameter, 100 mm; length, 2,000 ml); a runner (wall thickness, 50 mm; width, 300 mm; length, 1,000 ml); and a sheet (thickness, 25 mm; width, 600 mm; length, 900 mm). All but two of the samples had the following components:

glass fibers: alkali-resistant glass fibers with 17 wt% $ZrO_2$ having a diameter of 15 $\mu$m and the listed lengths;

wollastonite fibers: with average length of 250 $\mu$m;

alumina cement: 74 wt% $Al_2O_3$ and 23 wt% CaO.

The exceptions were the samples used in Comparative Examples 3 and 4 and they were commercial castable refractories having the following compositions:

Comparative Example 3: a "refractory castable" composed of 80% refractory chamotte and 20% calcium aluminate cement Comparative Example 4: a "lightweight castable" composed of 60% lightweight aggregate and 40% calcium aluminate cement.

The behavior of each samples when it was shaped into a sheet and the result of checking for the occurrence of cracking in fired hollow pipes are also shown in Table 1.

The moldings prepared in Example 3 were used as runners, raddles, trough, holding furnaces, ladles, transport pipes and other components of an aluminum die casting plant that would come in contact with molten metal. The plant could be operated consistently for a prolonged period without any occurrence of sticking of molten metal or melt leakage while ensuring good heat insulation.

The moldings produced in Examples 1 to 5 were held in contact with molten lead, tin or zinc for a period of 200 hours but none of them were wetted with these melts and all proved to be highly resistant to corrosion.

TABLE 1

|  | Examples ||||| Comparative Examples ||||
|---|---|---|---|---|---|---|---|---|---|
|  | 1 | 2 | 3 | 4 | 5 | 1 | 2 | 3 | 4 |
| composition (%) | | | | | | | | | |
| glass fibers (3 mm length) | — | 1 | — | — | — | — | — | | |
| glass fibers (12 mm length) | 0.3 | — | 1 | — | 5 | 5 | — | | |
| glass fibers (25 mm length) | — | — | — | 1 | — | — | — | | |
| Wollastonite fibers | 24.7 | 39 | 39 | 39 | 50 | — | 40 | | |
| Calcium aluminate | 75 | 60 | 60 | 60 | 45 | 95 | 60 | | |
| water mixed (%) | 35 | 40 | 40 | 40 | 45 | 28 | 40 | 18 | 40 |
| change in properties during sheet production | | | | | | | | | |
| density after drying (g/cm³) | 1.65 | 1.46 | 1.45 | 1.44 | 1.35 | 1.90 | 1.47 | 1.90 | 1.40 |
| density after firing (g/cm³) | 1.42 | 1.29 | 1.28 | 1.27 | 1.23 | 1.57 | 1.30 | 1.80 | 1.30 |
| flexural strength (kg/cm²) | | | | | | | | | |
| after drying | 135 | 78 | 84 | 91 | 76 | 92 | 67 | 40 | 20 |
| after firing | 82 | 61 | 65 | 7 | | | | | |
| 2 | 60 | * | 48 | 35 | 15 | | | | |
| shrinkage upon drying (%) | 0.34 | 0.32 | 0.32 | 0.32 | 0.25 | 0.45 | 0.33 | 0.10 | 0.20 |
| shrinkage upon firing (%) | 0.51 | 0.42 | 0.42 | 0.40 | 0.48 | * | 0.56 | 0.30 | 0.50 |

TABLE 1-continued

|  | Examples | | | | | Comparative Examples | | | |
| --- | --- | --- | --- | --- | --- | --- | --- | --- | --- |
|  | 1 | 2 | 3 | 4 | 5 | 1 | 2 | 3 | 4 |
| cracking in pipe | X | X | X | X | X | O | O | O | O |

X: absent;
O: present,
*too many cracks to justify measurement.

What is claimed is:

1. A molding material for manufacture of lining materials and receptacles for use with a low-melting point metal casting apparatus consisting essentially of a mixture of 0.1-7 wt% glass fibers, 20-60 wt% of wollastonite fibers, and 40-80 wt% of calcium aluminate cement.

2. A molding material as recited in claim 1, wherein said mixture is restricted to 0.3-5 wt% of glass fibers, 24.7-50 wt% of wollastonite fibers, and 45-75 wt% of calcium aluminate cement.

3. A molding material according to claim 1 wherein said glass fibers are alkali-resistant glass fibers containing a zirconia component.

4. A molding material according to claim 1 wherein said glass fibers have an average length of 3-25 mm.

* * * * *